(12) United States Patent
Malandain et al.

(10) Patent No.: US 12,017,550 B2
(45) Date of Patent: *Jun. 25, 2024

(54) CONNECTION DEVICE FOR VEHICLE EQUIPPED WITH A TEMPERATURE SENSOR

(71) Applicant: Aptiv Technologies AG, Schaffhausen (CH)

(72) Inventors: Olivier Malandain, Ormes (FR); Stephane Barlerin, Dieulefit (FR)

(73) Assignee: APTIV TECHNOLOGIES AG, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,738

(22) Filed: Jul. 17, 2023

(65) Prior Publication Data

US 2023/0356609 A1    Nov. 9, 2023

Related U.S. Application Data

(63) Continuation of application No. 18/091,793, filed on Dec. 30, 2022, now Pat. No. 11,745,609, which is a
(Continued)

(30) Foreign Application Priority Data

Oct. 23, 2018   (FR) ....................... 1859762

(51) Int. Cl.
*B60L 53/16*   (2019.01)
*G01K 3/10*   (2006.01)
(Continued)

(52) U.S. Cl.
CPC ............... *B60L 53/16* (2019.02); *G01K 3/10* (2013.01); *H01R 12/57* (2013.01); *H01R 13/6683* (2013.01); *H01R 2201/26* (2013.01)

(58) Field of Classification Search
CPC ........... H01R 13/6658; H01R 13/6683; H01R 12/57; H01R 2201/26; B60L 53/16; G01K 3/10
(Continued)

(56) References Cited

U.S. PATENT DOCUMENTS

| 11,642,974 B2 * | 5/2023 | Malandain ............. | H01R 12/57 439/620.22 |
| 11,745,609 B2 * | 9/2023 | Malandain ............. | H01R 12/57 439/620.22 |

(Continued)

FOREIGN PATENT DOCUMENTS

| CN | 105811184 A | 7/2016 |
| CN | 106956613 A | 7/2017 |

(Continued)

*Primary Examiner* — Gary F Paumen
(74) *Attorney, Agent, or Firm* — Billion & Armitage

(57) ABSTRACT

A connection device includes a housing, a power contact disposed within the housing, and a printed circuit board mounted in the housing having a first face provided with a first metal pad which is located between the printed circuit board and a surface of the power contact, and a second face provided with a first temperature sensor which is arranged opposite the first metal pad. A method of electrical connection to a vehicle to a charging cord provided with a charging socket is also provided.

20 Claims, 4 Drawing Sheets

Related U.S. Application Data continuation of application No. 17/287,989, filed as application No. PCT/IB2019/059002 on Oct. 22, 2019, now Pat. No. 11,642,974.

(51) Int. Cl.
  *H01R 12/57*  (2011.01)
  *H01R 13/66*  (2006.01)

(58) Field of Classification Search
  USPC .................. 439/488, 620.22, 620.24, 620.25
  See application file for complete search history.

(56) References Cited

U.S. PATENT DOCUMENTS

| | | | |
|---|---|---|---|
| 2004/0203276 A1* | 10/2004 | Kajiura | H01R 13/6683 374/E7.042 |
| 2010/0315752 A1* | 12/2010 | Rabu | H01R 31/06 174/250 |
| 2016/0093988 A1* | 3/2016 | Yue | A41D 1/005 361/103 |
| 2018/0233936 A1* | 8/2018 | Yamada | H02J 7/00 |
| 2018/0259731 A1* | 9/2018 | Dupeux | G02B 6/4271 |
| 2020/0067237 A1* | 2/2020 | Sarraf | H01R 13/6683 |
| 2020/0412069 A1* | 12/2020 | Malandain | H05K 1/0206 |

FOREIGN PATENT DOCUMENTS

| | | |
|---|---|---|
| CN | 207381646 U | 5/2018 |
| DE | 102016211876 A1 | 1/2018 |

\* cited by examiner

CONNECTION DEVICE FOR VEHICLE EQUIPPED WITH A TEMPERATURE SENSOR

CROSS-REFERENCE TO RELATED APPLICATIONS

This application is a continuation of U.S. application Ser. No. 18/091,793, filed on Dec. 30, 2022, which was a continuation of U.S. application Ser. No. 17/287,989, filed on Oct. 22, 2019, which was a National Stage Application of International Patent Application No. PCT/IB2019/059002, which claimed the benefit of French Patent Application No. 1859762 filed on Oct. 23, 2018, the content of each of which is hereby incorporated in its entirety herein by reference.

This patent application is directed to a connection device for the electrical connection of a vehicle to a charging cord, more particularly to a connection device including a connection base provided with at least two power contacts intended for recharging the batteries of an electric or hybrid vehicle.

BACKGROUND

To allow a reduced charging time, it is planned to increase the electric charging power, which requires increasing the charging voltage and the current intensity. It is planned to increase the intensity of the electric current from 125 to 200 Amperes currently, for direct current charging, to 500 Amperes.

The significant increase in the intensity of the current brings greater risks of overheating, which can cause fire to start. It is therefore necessary to monitor any rise in temperature, in particular at the level of the power contacts, by means of temperature sensors.

SUMMARY

According to one or more aspects of the present disclosure, a connection device for the electrical connection of a vehicle to a charging cord is provided with a charging socket. The connection device includes a housing in which are mounted to the at least first and second power contacts. Each power contact including a front section which extends in a connection base at the front of the housing and a rear section which extends in a rear part of the housing, in a direction substantially parallel to a direction of connection of the charging socket. The connection base is provided to allow the connection of an additional charging socket. Advantageously, at least one printed circuit board is mounted in the rear part of the housing. The printed circuit board extends in a plane substantially parallel to the direction of connection. The printed circuit board includes a first face provided with a first metal pad which is compressed between the printed circuit board and an axial surface of the rear section of the first power contact and a second face provided with a first temperature sensor which is arranged opposite the first metal pad, so as to allow rapid detection of any abnormal rise in temperature at the level of the first power contact.

According to another advantageous characteristic, the housing has in its rear part two grooves substantially parallel to the direction of connection which receive opposite edges of the printed circuit board.

According to another advantageous characteristic, the housing has in its rear part a retaining wall which is substantially parallel to the direction of connection, and which is in contact with the axial surface of the rear section of the first power contact, in an area of the first contact of power diametrically opposite to the first metal pad.

According to another advantageous characteristic, the retaining wall includes a portion of cylindrical surface which matches the axial surface of the rear section with which the retaining wall is in contact.

According to another advantageous characteristic, the printed circuit board has on its first face a second metal pad which is compressed between the printed circuit board and an axial surface of the rear section of the second power contact, and on its second face a second sensor temperature which is arranged opposite the second metal pad.

According to another advantageous characteristic, the first and second temperature sensors are electronic components mounted on the surface and soldered to the second face of the printed circuit board.

According to another advantageous characteristic, the metal pad is produced with silver or tin which is deposited on the first side of the printed circuit board.

According to another advantageous characteristic, the layer of silver or tin forming each metal pad is deposited on a copper surface previously arranged on the first face of the printed circuit board.

DESCRIPTION OF THE DRAWINGS

Other characteristics, objects and advantages of the invention will appear on reading the detailed description which follows, and with reference to the appended drawings, given by way of non-limiting example and in which.

DETAILED DESCIRPTION

Figure 1:
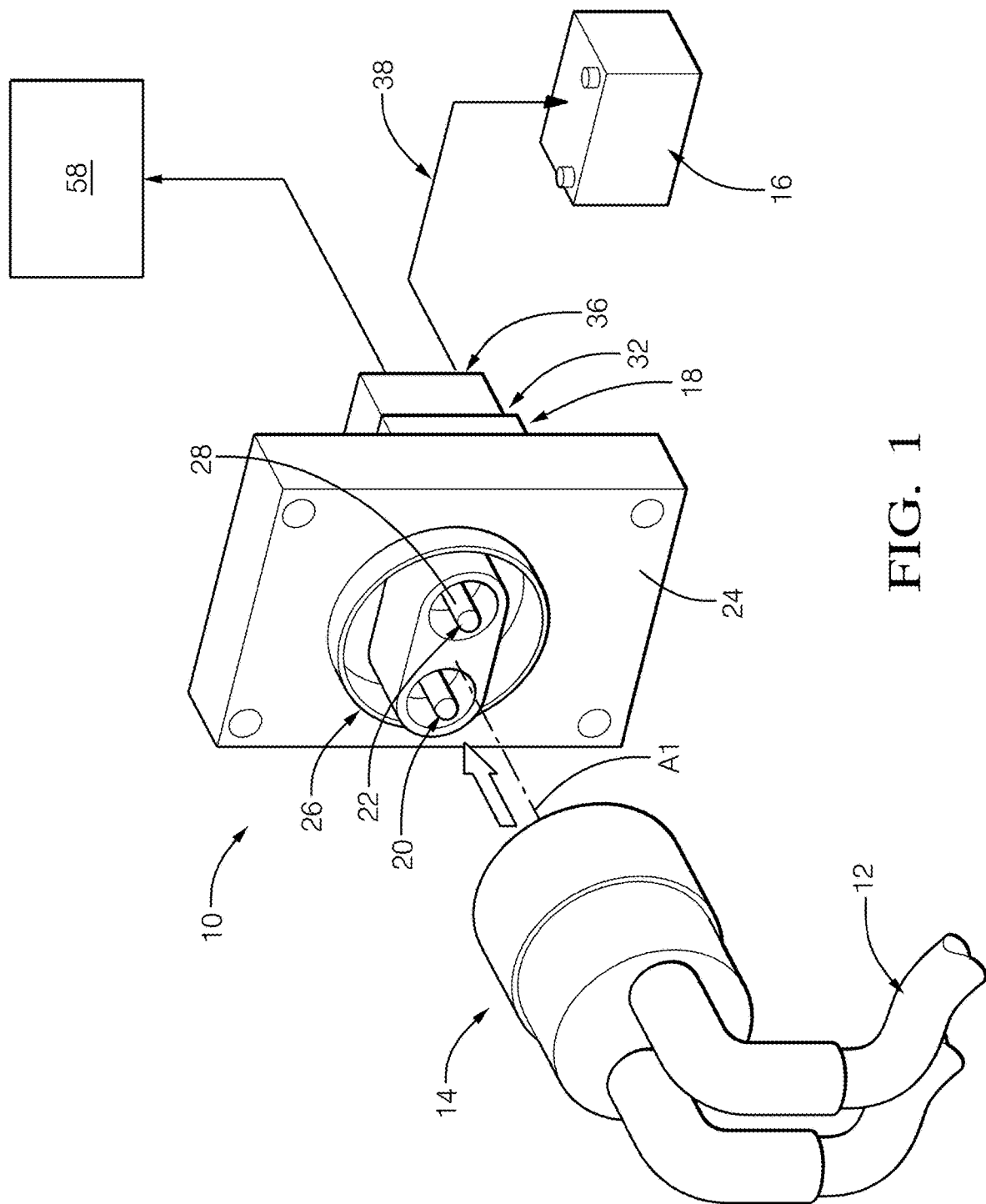
FIG. 1 is a general perspective view which represents a connection device for the connection of a charging socket.

FIG. 1 represents a connection device 10 for the electrical connection of a vehicle (not shown) to a charging cord 12 provided with a charging socket 14. The connection device 10 is itself electrically connected to at least a battery 16 on board the vehicle and intended to be charged via the charging socket 14.

The connection device 10 includes a housing 18 in which are mounted a first and a second power contacts 20, 22. The housing 18 includes, in a front wall 24, that is to say on the side of the charging socket 14, a base of connection 26 which is configured to additionally receive the charging socket 14 in order to establish an electrical connection between the charging cord 12 and the battery 16.

In the following description, use will be made, without limitation, of an orientation from the front towards the rear in a direction of connection A1 of the charging socket 14 in the connection base 26. In addition, identical elements or similar may be designated by the same references.

Figure 2:
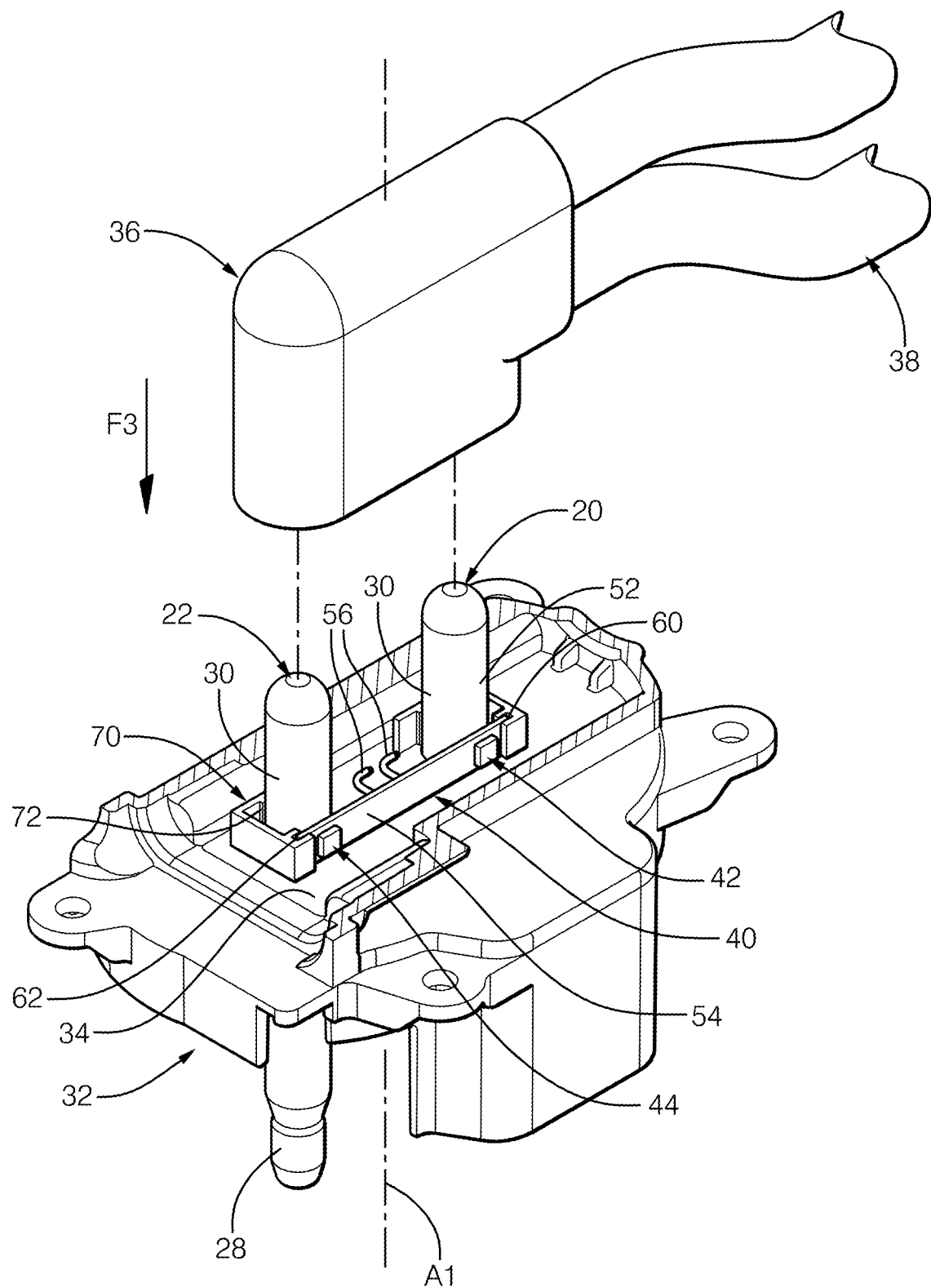
FIG. 2 is a perspective view which represents the rear part of the connection device of FIG. 1 equipped with temperature sensors according to an embodiment of the invention.

As can be seen more particularly in FIG. 2, each power contact 20, 22 has the shape of a generally cylindrical rod which has a front section 28 extending in the connection base 26, at the front of the housing 18, and a rear section 30 extending in a rear part 32 of the housing 18. The rear part 32 of the housing 18 has a rear wall 34 which is substantially perpendicular to the direction of connection A1. The rear section 30 of each contact power 20, 22 extends beyond the rear wall 34 towards the rear to allow electrical connection to the battery 16. A connector 36, connected to the battery 16 by cables 38, is provided to be mounted against the rear part 32 of the housing 18 by establishing electrical contact with the rear section 30 of each power contact 20, 22.

Figure 3:
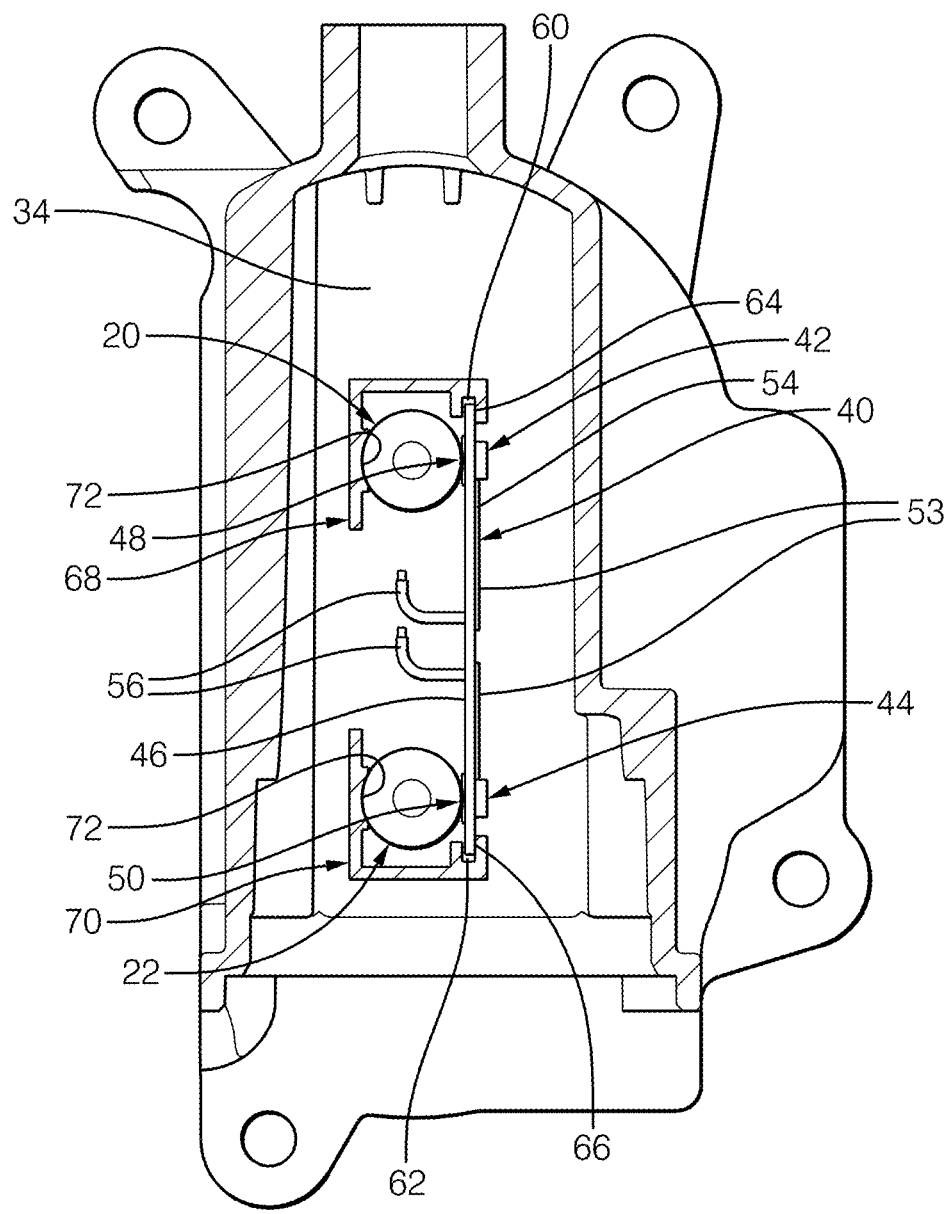
FIG. 3 is a top view in the direction F3 which represents the rear part of the connection device of FIG. 2.
Figure 4:
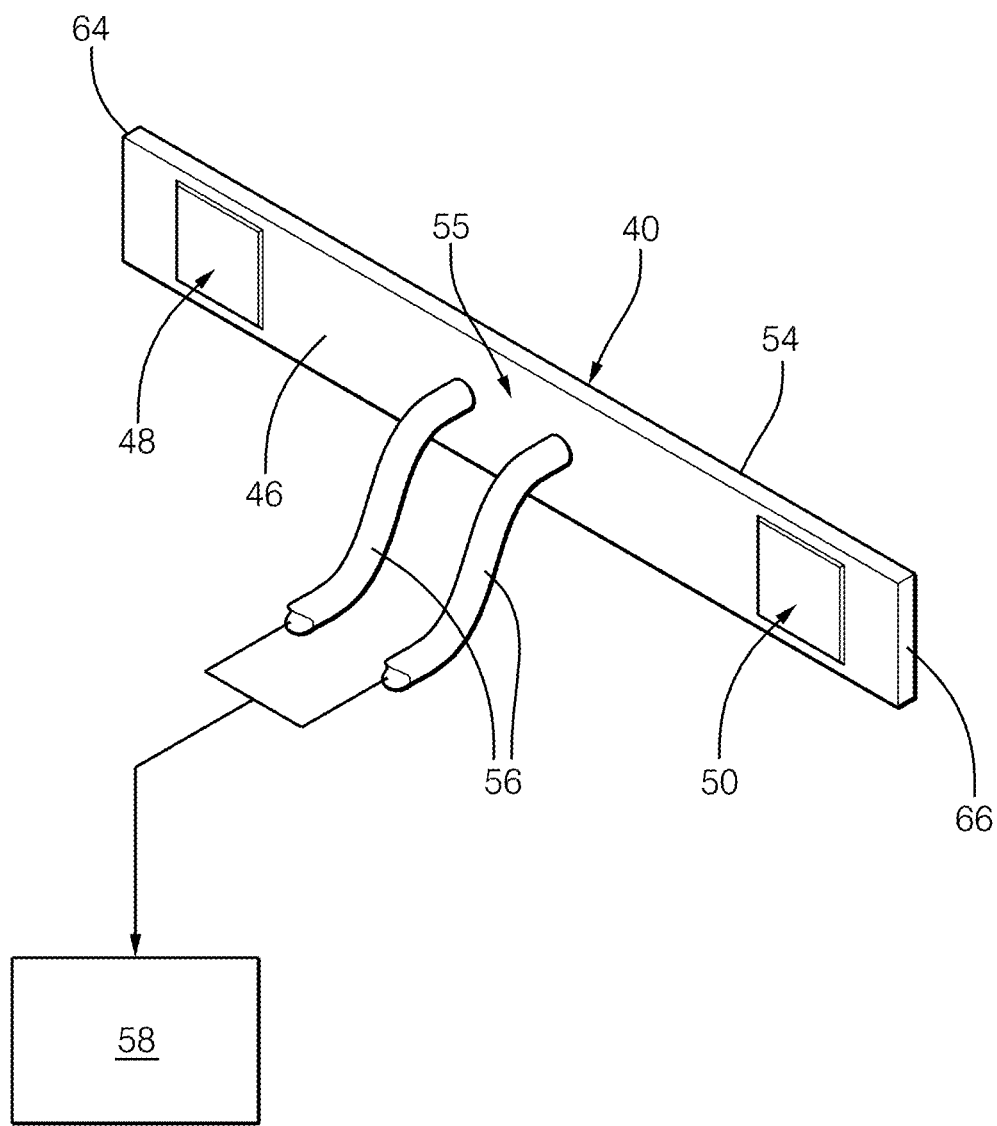
FIG. 4 is a perspective view which represents the printed circuit board provided with metal pads which equips the connection device according to the invention.

According to an embodiment of the invention, illustrated more particularly by FIGS. 2, 3, and 4, a printed circuit board 40, provided with first and second temperature sensors 42, 44, is mounted in the rear part 32 of the housing 18 so that the printed circuit board 40 extends in a plane substantially parallel to the direction of connection A1. More specifically, in the present nonlimiting example, the printed circuit board 40 has here the shape of a rectangular plate whose width extends parallel to the direction of connection A1 and whose length extends perpendicular to the direction of connection A1, from the first power contact 20 to the second power contact 22. As a variant, other mounting orientations of the printed circuit board 40 can make it possible to obtain a printed circuit board 40 which extends in a plane substantially parallel to the branching direction A1. The printed circuit board 40 has a first face 46 provided with first and second metal pads 48, 50 which are provided to be pressed against the external cylindrical wall 52 of the associated power contact 20, 22. The first and second temperature sensors 42, 44 are mounted on a second face 54 of the printed circuit board 40, on the side opposite to the metal pads 48, 50. Advantageously, the first temperature sensor 42 is arranged opposite the first metal pad 48 and the second temperature sensor 44 is arranged opposite the second metal pad 50.

The printed circuit board 40 has conductive traces 53 which allow the electrical connection of the temperature sensors 42, 44 to a connection area 55 where electrical wires 56 are connected. The electrical wires 56 allow the temperature information supplied by the temperature sensors 42, 44 to an associated electronic control unit 58. The electronic control unit 58 can thus detect, via the temperature sensors 42, 44, an abnormal rise in temperature at the level of the power contacts and trigger a trip to safety of the connection device 10.

Advantageously, the metal pads 48, 50 are produced by depositing metal according to technologies for manufacturing a printed circuit board, for example by depositing a layer of silver or a layer of tin on the first face 46 of the printed circuit board 40. More particularly, the printed circuit board 40 is provided with a copper layer which serves to form the conductive traces 53 for the electrical connection of the components, such as the temperature sensors 42, 44 mounted on the printed circuit board 40. Copper surfaces, the shape of which generally corresponds to the shape of the metal pads, are therefore arranged on the first face 46 of the printed circuit board 40 and a layer of silver or a layer of tin are deposited, by a suitable method, on these copper surfaces so as to form the metal pads 48, 50. The metal pads 48, 50 thus form metallic platelets, metallic studs, or metallic pads.

The material forming the metal pads 48, 50 is chosen to be relatively soft so that the external surface of the metal pad 48, 50 can deform when it is pressed against the external cylindrical wall 52 of the associated power contact 20, 22. The metal pads 48, 50 have a sufficient thickness to allow slight deformation of the material on the surface of each metal pad 48, 50, where the power contact 20, 22 comes to bear. This makes it possible to maximize the contact surface between each metal pad 48, 50 and the associated power contact 20, 22 to ensure optimal thermal conductivity between the two elements. Advantageously, each metal pad 48, 50 has a thickness, perpendicular to the printed circuit board 40 of between 1 and 50 μm.

The material chosen for the metal pads 48, 50 is also chosen for its qualities of thermal conduction to the temperature sensors 42, 44, for its ability to withstand the high electrical voltages passing through the power contacts 20, 22, and for its reasonable cost. Alternatively, the metal pads 48, 50 can be made of another material which is easy to deposit on the printed circuit board 40 and which offers similar qualities and properties.

The arrangement of the metal pads 48, 50 relative to the power contacts 20, 22 must make it possible to avoid as much as possible the presence of air between these two elements, which penalizes thermal conduction towards the temperature sensors 42, 44.

According to the embodiment shown here, the metal pads 48, 50 are of rectangular or square shape. Alternatively, they could be of different shapes, for example round or oval.

Advantageously, the temperature sensors 42, 44 are electronic components for surface mounting (SMC or "Surface Mount Component"). They are soldered directly to the second face 54 of the printed circuit board 40. The mounting of the temperature sensors 42, 44 on the face of the printed circuit board 40 opposite the power contacts 20, 22 makes it possible to provide protection. temperature sensors 42, 44 against high voltages passing through the power contacts 20, 22, the substrate of the printed circuit board 40 acting as a protective barrier.

According to the embodiment shown, the rear part 32 of the housing 18 has two grooves 60, 62 substantially parallel to the direction of connection A1 which receive opposite edges 64, 66 of the printed circuit board 40. Thus, the printed circuit board 40 can be mounted on the rear wall 34 by sliding in the grooves 60, 62, from rear to front in the direction of connection A1.

According to the embodiment shown, the rear part 32 of the housing 18 includes a first and a second retaining wall 68, 70 which are substantially parallel to the direction of connection A1, and which are in contact with the axial surface of the rear section 30 respectively of the first power contact 20 and the second power contact 22. Each retaining wall 68, 70 is in contact with the power contact 20, 22 associated on the side opposite to the associated metal pad 48, 50. Advantageously, each retaining wall 68, 70 includes a portion of cylindrical surface 72 which matches the axial surface, or external cylindrical wall, of the rear section 30 with which the retaining wall 68, 70 is in contact. The positioning of the retaining wall 68, 70 with respect to the grooves 60, 62 and with respect to the thickness of the printed circuit board 40 is provided to ensure a slight pressure of the rear section 30 of each power contact 20, 22 against the metal pad 48, 50 associated when all the elements are mounted together. This results in a forced mounting of the power contacts 20, 22 between the retaining walls 68, 70 and the metal pads 48, 50, and/or a forced mounting of the printed circuit board 40 in the grooves 60, 62 This ensures optimal contact between the power contacts 20, 22 and the metal pads 48, 50. This optimal contact ensures optimal thermal conduction from the power contact 20, 22 to the temperature sensor 42, 44 associated, through the metal pad 48, 50 and through the thickness of the printed circuit board 40.

In the embodiment shown, the retaining walls 68, 70 and the grooves 60, 62 are produced integrally by injection of plastic material with the rear wall 34. Each groove 60, 62 is formed in a portion of wall which comes extend the retaining wall 68, 70 associated opposite.

The embodiment shown corresponds to a connection device 10 for a connection base 26 with two power contacts 20, 22. Of course, the invention also applies to connection bases 26 including more than two power contacts 20, 22.

LIST OF REFERENCE NUMBERS

10 connection device
12 charging cord
14 charging
16 battery
18 case
20 first power contact
22 second power contact
24 front wall
26 connection base
28 front section
30 rear section
32 rear section
34 rear wall
36 connector
38 cables
40 printed circuit board
42 first temperature sensor
44 second temperature sensor
46 first side
48 first metal pad
50 second metal pad
52 external cylindrical wall
53 conductive traces
54 second side
56 electric wires
58 electronic control unit
60 first groove
62 second groove
64 first edge
66 second edge
68 first retaining wall
70 second retaining wall
72 portion of cylindrical surface

The invention claimed is:

1. A connection device, comprising:
a housing;
a power contact disposed within the housing; and
a printed circuit board mounted in the housing having a first face provided with a first metal pad located between the printed circuit board and a surface of the power contact, and a second face provided with a first temperature sensor which is arranged opposite the first metal pad.

2. The connection device according to claim 1, wherein a connection base is provided to allow connection of a charging socket.

3. The connection device according to claim 1, wherein the housing has two grooves which receive opposite edges of the printed circuit board.

4. The connection device according to claim 1, wherein the housing has a retaining wall which is in contact with the surface of the power contact in an area of the power contact located opposite to the first metal pad.

5. The connection device according to claim 4, wherein the retaining wall comprises a cylindrical surface portion which matches the surface of the power contact with which the retaining wall is in contact.

6. The connection device according to claim 1, wherein the printed circuit board has a second metal pad on its first face which is located between the printed circuit board and a surface of a rear section of a second power contact and a second temperature sensor on its second face which is arranged opposite of the second metal pad.

7. The connection device according to claim 6, wherein the first and second temperature sensors are electronic components mounted on the surface of the printed circuit board and are welded to the second face of the printed circuit board.

8. The connection device according to claim 1, wherein the metal pad has a layer of silver deposited on the first face of the printed circuit board.

9. The connection device according to claim 8, wherein the layer of silver is deposited on a copper surface on the first face of the printed circuit board.

10. The connection device according to claim 1, wherein the metal pad has a layer of tin deposited on the first face of the printed circuit board.

11. The connection device according to claim 10, wherein the layer of tin is deposited on a copper surface on the first face of the printed circuit board.

12. The connection device according to claim 1, wherein the power contact has a front section disposed in a front part of the housing and a rear section disposed in a rear part of the housing.

13. The connection device according to claim 12, wherein the printed circuit board is mounted in the rear part of the housing.

14. The connection device according to claim 12, wherein the first metal pad is located between the printed circuit board and a surface of the rear section of the power contact.

15. A method of making an electrical connection with a vehicle, comprising:
disposing a power contact disposed within a housing; and
mounting a printed circuit board in the housing, wherein a first face of the printed circuit board is provided with a first metal pad which is located between the printed circuit board and a surface of the power contact, and a second face of the printed circuit board is provided with a first temperature sensor which is arranged opposite the first metal pad so as to allow rapid detection of a temperature of the power contact.

16. The method according to claim 15, wherein the power contact is a first power contact and wherein the method further comprises:
disposing a second power contact disposed within the housing, wherein each power contact has a front section disposed in a front part of the housing which extends in a connection base and a rear section disposed in a rear part of the housing.

17. The method according to claim 16, wherein the connection base allows the connection of a charging socket.

18. The method according to claim 16, wherein the first face of the printed circuit board is provided with a second metal pad which is located between the printed circuit board and an axial surface of the rear section of the second power contact and the second face of the printed circuit board is provided with a second temperature sensor which is arranged opposite the second metal pad, so as to allow detection of a temperature of the second power contact.

19. The method according to claim 15, wherein the printed circuit board extends in a plane substantially parallel to a direction of connection.

20. The method according to claim 15, further comprising:

inserting opposite edges of the printed circuit board within grooves defined by the housing.

* * * * *